US010841455B2

(12) United States Patent
Shimotsu (10) Patent No.: US 10,841,455 B2
(45) Date of Patent: Nov. 17, 2020

(54) INFORMATION MANAGEMENT SYSTEM AND INFORMATION MANAGEMENT SERVER

(71) Applicant: KYOCERA Document Solutions Inc., Osaka (JP)

(72) Inventor: Yuki Shimotsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/473,677

(22) PCT Filed: Oct. 20, 2017

(86) PCT No.: PCT/JP2017/037983
§ 371 (c)(1),
(2) Date: Jun. 26, 2019

(87) PCT Pub. No.: WO2018/123226
PCT Pub. Date: Jul. 5, 2018

(65) Prior Publication Data
US 2019/0320087 A1 Oct. 17, 2019

(30) Foreign Application Priority Data
Dec. 26, 2016 (JP) .................................. 2016-250988

(51) Int. Cl.
*H04N 1/32* (2006.01)
*H04L 29/08* (2006.01)
*H04N 1/00* (2006.01)

(52) U.S. Cl.
CPC ..... *H04N 1/32678* (2013.01); *H04L 67/1095* (2013.01); *H04N 1/00244* (2013.01);
(Continued)

(58) Field of Classification Search
CPC .................................................... H04N 1/32678
(Continued)

(56) References Cited

U.S. PATENT DOCUMENTS

| 9,395,940 B1 | 7/2016 | Watkins et al. | |
| 2007/0086054 A1* | 4/2007 | Ikeno | G06K 15/00 358/1.16 |
| 2016/0085486 A1 | 3/2016 | Yokozawa | |

FOREIGN PATENT DOCUMENTS

| JP | 2003-063108 A | 3/2003 |
| JP | 2005-006212 A | 1/2005 |

(Continued)

OTHER PUBLICATIONS

European Patent Office. Extended European Search Report of foreign counterpart dated Aug. 4, 2020.

*Primary Examiner* — Jacky X Zheng
(74) *Attorney, Agent, or Firm* — Hawaii Patent Services; Nathaniel K. Fedde; Kenton N. Fedde (57) ABSTRACT

Use of a replacement image forming apparatus is immediately performed.
When a first system control unit of a first MFP is instructed to start backup of data stored in a first HDD and a first EEPROM, the first system control unit transmits the data to an information management server, and when a second system control unit of a second MFP is instructed to start setting, the second system control unit issues a download request including a storage capacity of the second HDD and the second EEPROM to the information management server, and a third system control unit of the information management server stores data from the first MFP in a third HDD, reads data from the third HDD according to a storage capacity of the second HDD and the second EEPROM, and transmits the data to the second MFP.

10 Claims, 6 Drawing Sheets

(52) U.S. Cl.
CPC ..... *H04N 1/00344* (2013.01); *H04N 1/32101* (2013.01); *H04N 1/32641* (2013.01); *H04N 2201/0094* (2013.01)

(58) Field of Classification Search
USPC ........................................................ 358/1.14
See application file for complete search history.

(56) References Cited

FOREIGN PATENT DOCUMENTS

| | | | | |
|---|---|---|---|---|
| JP | 2005006012 | A | * | 1/2005 |
| JP | 2016-103141 | A | | 6/2016 |
| JP | 2016103141 | A | * | 6/2016 |

* cited by examiner

(BACKUP INFORMATION MANAGEMENT TABLE) 500

| USER IDENTIFICATION INFORMATION 501 | MODEL IDENTIFICATION INFORMATION 502 | BACKUP DATA AMOUNT 503 | | | |
|---|---|---|---|---|---|
| | | IMAGE DATA | SETTING VALUE DATA | USER REGISTRATION DATA | VERSION DATA |
| AA0001 | AS-1122 | 500 G B | 100 M B | 100 M B | 50 M B |
| AA0002 | BS-2233 | 600 G B | 110 M B | 200 M B | 60 M B |
| AA0003 | CS-3344 | 700 G B | 120 M B | 300 M B | 70 M B |
| AA0004 | DS-4455 | 800 G B | 130 M B | 400 M B | 80 M B |
| ……… | ……… | ……… | ……… | ……… | ……… |

INFORMATION MANAGEMENT SYSTEM AND INFORMATION MANAGEMENT SERVER

TECHNICAL FIELD

The present invention relates to an information management system and an information management server suitable for managing backup information.

BACKGROUND ART

For example, in image forming apparatuses that are an MFP Multifunction Peripheral) such as a multifunction printer, a complex apparatus or the like, there are models equipped with a printing function, a copy function, a FAX function, a data transmission/reception function via a network, and the like as standard installed functions. In addition, an image forming apparatus stores various information such as image data registered by the users, setting value data set by the users, user registration data of each user, version data of firmware that controls the operation of each function, and the like.

Incidentally, in an image forming apparatus, for example, a backup system that is prepared for failure or the like is provided. As an example, as illustrated in Patent Literature 1, an image forming apparatus management system is known in which an image forming apparatus is connected to a host computer on a maintenance company side via a network, and a failure notification is transmitted from the image forming apparatus to the host computer when the image forming apparatus fails.

In other words, in the image forming apparatus management system in Patent Literature 1, when an operating state detection unit detects a failure of a copying machine, failure data corresponding to the detection result, mail addresses of a failure management host computer and the PHS of a service person are read from a storage unit, and a control unit transmits the failure data and the mail information to a transmitting-side server. When the transmitting-side server distributes the mail information to a receiving-side server, the receiving-side server notifies the failure management host computer and the PHS of the arrival of the mail. Then, the failure management host computer or the PHS side that has received the notification accesses the receiving-side server, and takes in the distributed mail information.

CITED LITERATURE

Patent Literature

Patent Literature 1: JP 2003-063108 A

SUMMARY OF INVENTION

Technical Problem

In the image forming apparatus management system in Patent Document 1 described above, when the copying machine fails, the failure management host computer and the PHS are notified of the arrival of the mail, so the failure management host computer and the PHS of the service person check the mail contents, whereby it is possible to know which copy machine has failed and in what kind of failure state the copying machine is in. As a result, the service person may perform preparation for repair quickly and accurately.

However, in the case of an image forming apparatus, for example, there are cases in which it may be necessary to replace the failed image forming apparatus with a replacement image forming apparatus, and use the replacement image forming apparatus. In this case, when the image forming apparatus management system described in Patent Literature 1 is applied, the service person may be promptly notified, so it is feasible that replacement with and use of a replacement image forming apparatus can be performed smoothly.

However, in the image forming apparatus management system described in Patent Document 1, there is no backup of various information such as image data registered by the users, setting value data set by the users, user registration data of each user, firmware version data that controls the operation of each function and the like that is stored in the failed image forming apparatus. Therefore, although it becomes possible to use a replacement image forming apparatus in the place of a failed image forming apparatus, there is a problem in that it takes time to transfer over various information, so it may not be possible to use the replacement image forming apparatus immediately.

The present invention has been made in view of such circumstances, and an object of the present invention is to provide an information management system and an information management server that can solve the problems described above.

Solution to Problem

The information management system according to the present invention includes: a first image forming apparatus that transmits data stored in a first storage device; a second image forming apparatus that downloads the data and stores the data in a second storage device; and an information management server that stores the data from the first image forming apparatus in a third storage device, and transmits the data stored in the third storage device according to a download request from the second image forming apparatus; wherein the first image forming apparatus has a first system control unit that, when there is an instruction to start backup of the data, transmits the data to the information management server; the second image forming apparatus has a second system control unit that, when there is an instruction to start setting, issues the request including a storage capacity of the second storage device to the information management server; and the information management server has a third system control unit that reads the data according to the storage capacity of the second storage device from the third storage device and transmits the data to the second image forming apparatus.

The information management server according to the present invention includes: a third storage device that stores data transmitted from a first image forming apparatus and stored by a first storage device; and a third system control unit that, according to a download request from a second image forming apparatus having a second storage device, reads the data according to a storage capacity of the second storage device from the third storage device, and transmits the data to the second image forming apparatus.

The information management system and the information management server according to the present invention are such that when the first system control unit of the first image forming apparatus is instructed to start backup of data stored in the first storage device, the first system control unit transmits the data to the information management server, and when the second system control unit of the second image forming apparatus is instructed to start setting, the second system control unit issues a download request including the storage capacity of the second storage device to the information management server, and the third system control unit of the information management server stores the data from the first image forming apparatus in the third storage device, reads the data according to the storage capacity of the second storage device from the third storage device, and transmits the data to the second image forming apparatus.

As a result, the second image forming apparatus downloads data according to the storage capacity of the second storage device from the information management server, whereby information from the first image forming apparatus may be easily transferred over.

Effect of Invention

With the information management system and information management server according to the present invention, the second image forming apparatus downloads data according to the storage capacity of the second storage device from the information management server, whereby information from the first image forming apparatus may be easily transferred over, and so use of a replacement image forming apparatus may be performed immediately.

DESCRIPTION OF EMBODIMENTS

Hereinafter, an embodiment of an information management system of the present invention will be described with reference to FIGS. 1 to 6. Incidentally, the following MFPs (Multifunction Peripherals) 100A and 100B may be the same apparatus or separate apparatuses. In the present embodiment, for convenience of description, MFPs 100A and 100B are presumed to be separate apparatuses, and MFP 100B is used as a replacement, for example, when MFP 100A fails.

Figure 1:
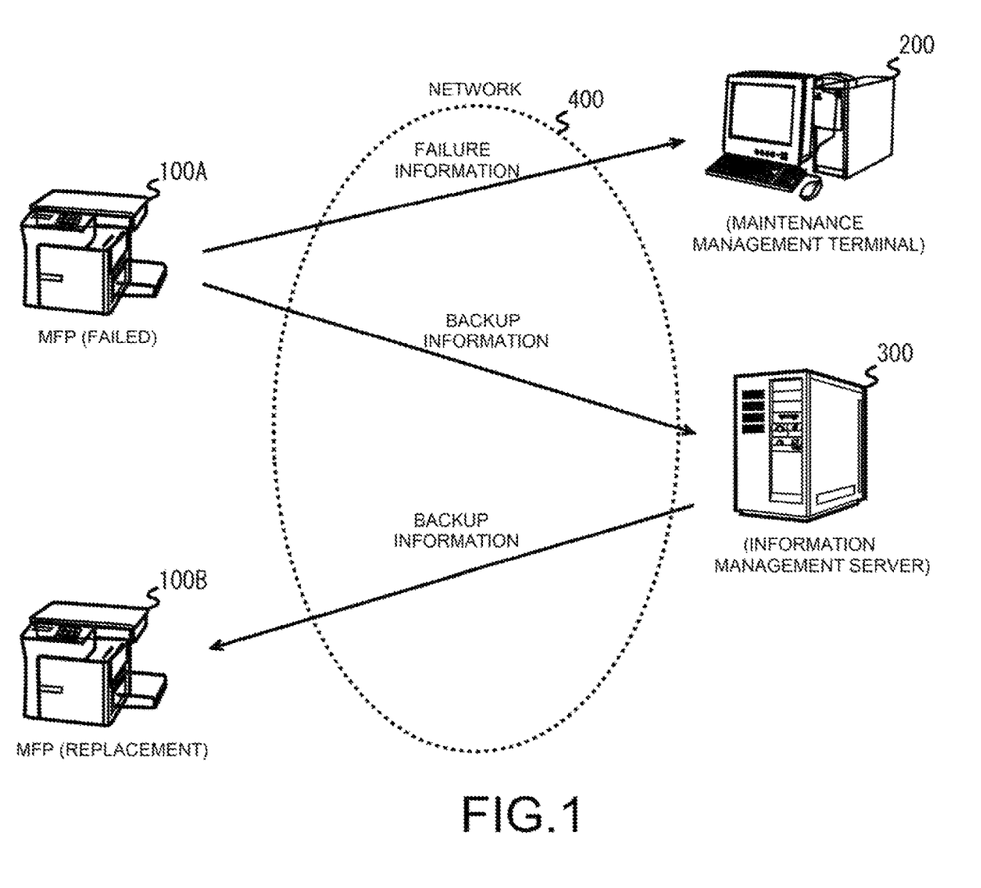
FIG. 1 is a diagram for describing an embodiment of an information management system of the present invention.

First, as illustrated in FIG. 1, the information management system includes MFPs 100A and 100B, a maintenance management terminal 200, and an information management server 300. In addition, the MFPs 100A and 100B, the maintenance management terminal 200, and the information management server 300 are connected to a network 400. MFPs 100A and 100B are complex peripheral apparatuses, for example, that are installed with standard installed functions such as a printing function, a copy function, a FAX function, a data transmission/reception function via a network and the like. When a failure is detected, the MFP 100A notifies the maintenance management terminal 200 of the failure information, and transmits backup information to the information management server 300. Note that the notification of the failure information and the transmission of the backup information to the information management server 300 performed by the MFP 100A may be automatic or may be executed in accordance with a data backup start instruction.

Here, the MFP 100A first issues a backup request to the information management server 300, and after receiving a response from the information management server 300, transmits backup information. The backup information is information stored in a HDD 106 or EEPROM 116 (described later) of the MFP 100A, and for example, is image data registered by users, setting value data set by users, user registration data of each user (for example, user authority information such as function restrictions and the like for users), version data of firmware that controls the operation of each function, and the like. Moreover, the backup request includes user identification information 501 (corresponds to the user identification information 501 in FIG. 3) and model identification information 502 (corresponds to the model identification information 502 in FIG. 3). Here, setting value data, user registration data, and version data are data necessary for setup. Furthermore, image data is presumed to be data that will be the target of processing by a stored information process such as printing, transmission, storage, and the like.

When the MFP 100B is used as a replacement for the MFP 100A, after connecting to the network 400, the MFP 100B downloads backup information of the MFP 100A stored in the information management server 300. Incidentally, the MFP 100B may be installed with the same functions as the MFP 100A, or may not be installed with the same functions.

The maintenance management terminal 200 is installed on a management company side that performs maintenance management of the MFPs 100A and 100B. The maintenance management terminal 200 receives failure information from the failed MFP 100A. The information management server 300 stores backup information from the MFP 100A, and when the replacement MFP 100B is connected to the network 400, transmits the stored backup information to the MFP 100B. Note that, the information management server 300 may be a shared server that is shared by a plurality of users, a dedicated server dedicated to one user, or a cloud server.

Figure 2:
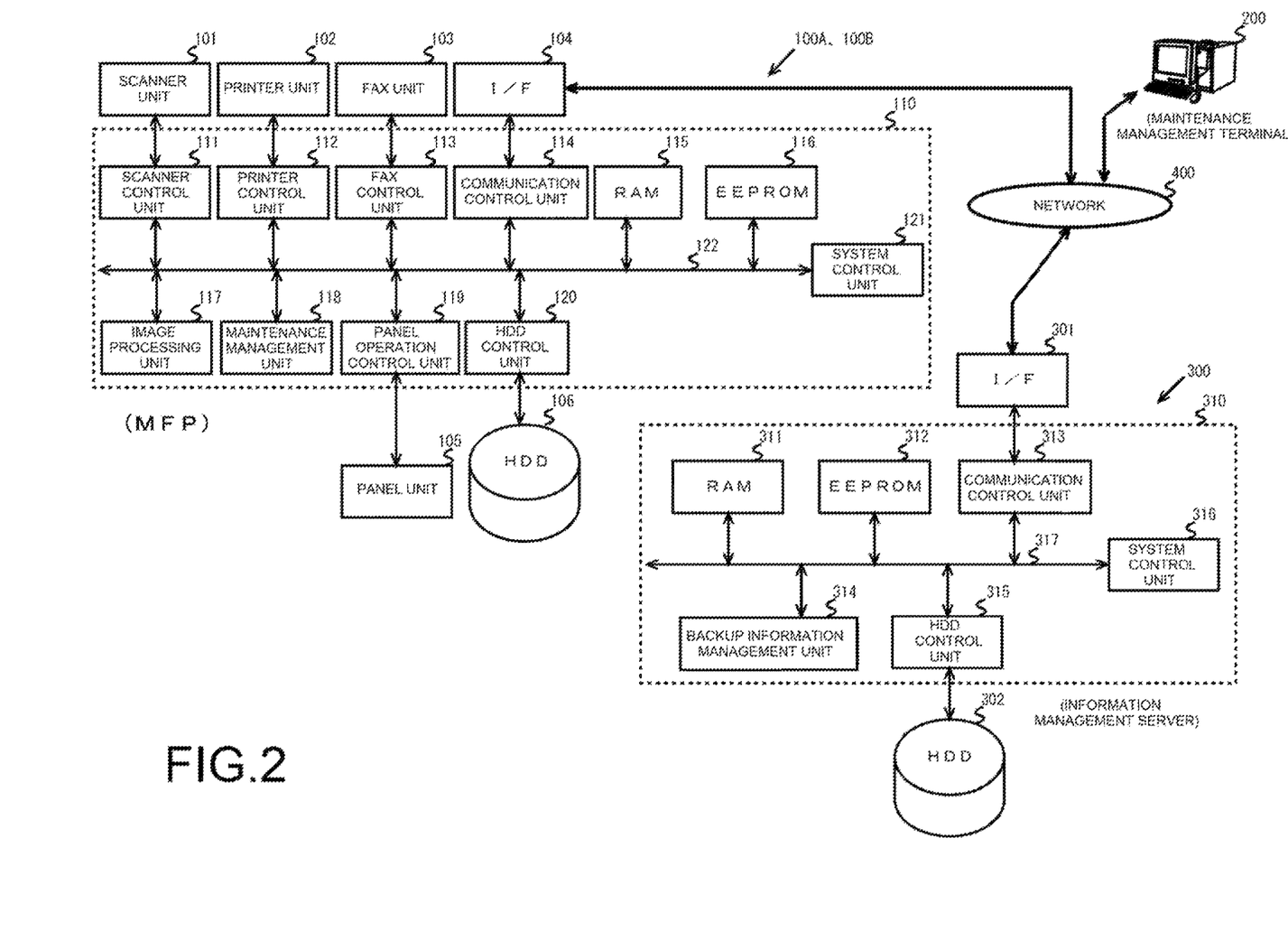
FIG. 2 is a diagram for describing a configuration of the MFP, the information management server, and the like in FIG. 1.

Next, configurations of the MFPs 100A and 100B, the information management server 300, and the like will be described with reference to FIG. 2. Incidentally, in the following, for convenience of explanation, it is presumed that MFP 100A and MFP 100B are installed with the same functions.

The MFPs 100A and 100B each includes a control unit 110 that controls the operation of a scanner unit 101, a printer unit 102, a FAX unit 103, an I/F (interface) 104, a panel unit 105, and a HDD 106.

The scanner unit 101 is a device that converts an image of a document (not illustrated) read by an image sensor (not illustrated) into digital image data, and inputs the digital image data to the control unit 110. The printer unit 102 is a device that prints an image on paper (not illustrated) based on printing data that is outputted from the control unit 110. The FAX unit 103 is a device that transmits data outputted from the control unit 110 to a facsimile of another party via a telephone line, and receives data from the facsimile of another party and inputs that data to the control unit 110.

The I/F 104 is connected to the maintenance management terminal 200 and the information management server 300 via the network 400. Note that the I/F 104 may be in charge of communication with another MFP, a user terminal, or the like (not illustrated), or may be in charge of communication with a content server, a web server, or the like (not illustrated). The panel unit 105 is a device such as a touch panel or the like for performing a display for a printing function, a copy function, a FAX function, a data transmission/reception function via the network 400, and various settings of the MFP 100. The HDD 106 is a storage device that stores application programs and the like for providing various functions of the MFP 100. In addition, the HDD 106, for example, also has a user box for storing image data of printing jobs registered from the user terminal side, printing correspondence data in a page description language, and the like. The HDD 106 also stores setting value data set by users, user registration data of each user, and the like.

The control unit 110 is a processor that controls an overall operation of the MFP 100 by executing an application program such as an authentication program and the like, an image forming program, a control program, and the like. The control unit 110 includes a scanner control unit 111, a printer control unit 112, a FAX (facsimile) control unit 113, a communication control unit 114, a RAM (random access memory) 115, an EEPROM (electrically erasable programmable read-only memory) 116, an image processing unit 117, a maintenance management unit 118, a panel operation control unit 119, an HDD control unit 120, and a system control unit 121. Moreover, these units are connected to a data bus 122.

The scanner control unit 111 controls the reading operation of the scanner unit 101. The printer control unit 112 controls the printing operation of the printer unit 102. The FAX control unit 113 controls the data transmission/reception operation of the FAX unit 103. The communication control unit 114, via the I/F 104, performs control of transmission/reception of data and the like via the network 400.

The RAM 115 is a work memory for executing a program. In addition, the RAM 115 stores printing data that has undergone image processing by the image processing unit 117. The EEPROM 116 stores a control program for performing an operation check or the like of each unit. Moreover, the EEPROM 116 stores firmware including version data for operating the scanner unit 101, the printer unit 102, the FAX unit 103, the I/F (interface) 104, the panel unit 105, the HDD 106 and the like.

The image processing unit 117 performs image processing (rasterization) on the image data read by the scanner unit 101. The image processing unit 117 also performs image processing (rasterization) on printing target data registered in a user box of the HDD 106. Incidentally, the system control unit 121 causes the RAM 115 to temporarily store the printing data that has undergone image processing by the image processing unit 117.

The maintenance management unit 118 manages information necessary for maintenance. As information necessary for maintenance there is address information (for example, IP address) of the maintenance management terminal 200, terminal connection information including a port number and the like, address information (for example, IP address) of the server 300, server connection information including a port number and the like, user identification information 501 (corresponds to user identification information 501 in FIG. 3 described later), model identification information 502 (corresponds to model identification information 502 in FIG. 3 described later), storage capacity information, and the like. This information is stored in a storage device such as the HDD 106 or the like. Note that, the terminal connection information, the server connection information, and the user identification information 501 may be stored in a storage device such as the HDD 106 or the like via the panel unit 105, for example, or may be imported from a storage device such as USB (universal serial bus) memory or the like by a maintenance service person or an administrator of the MFPs 100A and 100B. Model identification information 502 is information that is assigned to the MFPs 100A and 100B. The storage capacity information is the storage capacity of a storage device such as the HDD 106, the EEPROM 116, or the like. The storage capacity information is information obtained, for example, by confirming the storage capacity of a storage device such as the HDD 106, the EEPROM 116, or the like when the system control unit 121 is started.

The panel operation control unit 119 controls the display operation of the panel unit 105. In addition, the panel operation control unit 119, via the panel unit 105, receives instructions or the like to start printing, copying, FAX, data transmission/reception via the network 400, and the like, or to start setup when changing or registering settings such as the operation mode or the like of the MFPs 100A and 100B.

The system control unit 121 controls cooperative operation and the like of each unit. Moreover, after copying, printing or the like is selected via the panel unit 105, the system control unit 121, via the scanner control unit 111 or the printer control unit 112, controls reading of a document by the scanner unit 101 or controls printing on paper by the printer unit 102. Furthermore, at the time of starting from the power OFF mode, for example, the system control unit 121 acquires the storage capacity of storage devices such as the HDD 106, the EEPROM 116 and the like, and notifies the maintenance management unit 118 of the storage capacity.

On the other hand, the information management server 300 includes a control unit 310 that controls an I/F 301 and a HDD 302. The I/F 301, via the network 400, is connected to the MFPs 100A and 100B and the maintenance management terminal 200. Note that the I/F 301 may be in charge of communication with other MFPs, user terminals, and the like (not illustrated). The HDD 302 stores the above-described backup information that is received from the MFP 100A, a backup information management table 500 illustrated in FIG. 3 described later, and the like.

The control unit 310 is a processor that executes a control program or the like to control the overall operation of the information management server 300. The control unit 310 includes a RAM 311, an EEPROM 312, a communication control unit 313, a backup information management unit 314, an HDD control unit 315, and a system control unit 316. Moreover, these units are connected to a data bus 317.

The RAM 311 is a work memory for executing a program. The EEPROM 312 stores a control program for performing an operation check or the like of each unit. The communication control unit 313, via the I/F 301, performs control of transmission/reception of data and the like via the network 400. In addition, the communication control unit 313 receives the above-described backup information and the like from the MFP 100A. Moreover, the communication control unit 313 transmits backup information and the like in response to a request from the MFP 100B. A backup information management unit 314 manages a backup information management table 500 and the like (described later) that is stored in the HDD 302.

After receiving the backup information from the MFP 100A, the system control unit 316, via the communication control unit 313, instructs the HDD control unit 315 to store data in the HDD 302. In addition, the system control unit 316 causes the communication control unit 313 to transmit the backup information stored in the HDD 302 in response to a download request from the MFP 100B.

Next, the backup information management table 500 that is managed by the backup information management unit 314 will be described with reference to FIG. 3. In the backup information management table 500, for example, user identification information 501, model identification information 502, and backup data amount 503 are registered. The user identification information 501 is information that identifies a user who uses the MFPs 100A and 100B, and may be, for example, a character string such as AA0001, AA0002 or the like. Incidentally, the user identification information 501 may be information that is assigned, for example, on the administrator side that manages the information management server 300, or may be specified on the user side. By managing the user identification information 501, in response to a data download request, data of the same user as the user that requests the download can be transmitted, and security can be maintained.

The model identification information 502 is information that is assigned to the MFPs 100A and 100B. For example, in a case where the model identification information 502 is AS-1122, AS indicates a model, and 1122 indicates a unique number (for example, a serial number such as a manufacturing number or the like) of the apparatus. Therefore, from the first two characters of the model identification information 502, it is possible to determine whether or not the MFP that is the source of a download request and the MFP registered in the backup information management table 500 are the same model. The backup data amount 503 indicates the size of the each data included in the backup information; for example, the image data registered by the users, the setting value data set by the users, user registration data of each user, and the version data of firmware that controls the operation of each function. Here, for example, in a case where the user identification information 501 of the MFP 100A is AA0001 and the model identification information 502 is AS-1122, the backup data amount 503 indicates that the image data is 500 GB, the setting value data is 100 MB, the user registration data is 100 MB, and the version data is 50 MB.

Figure 4:
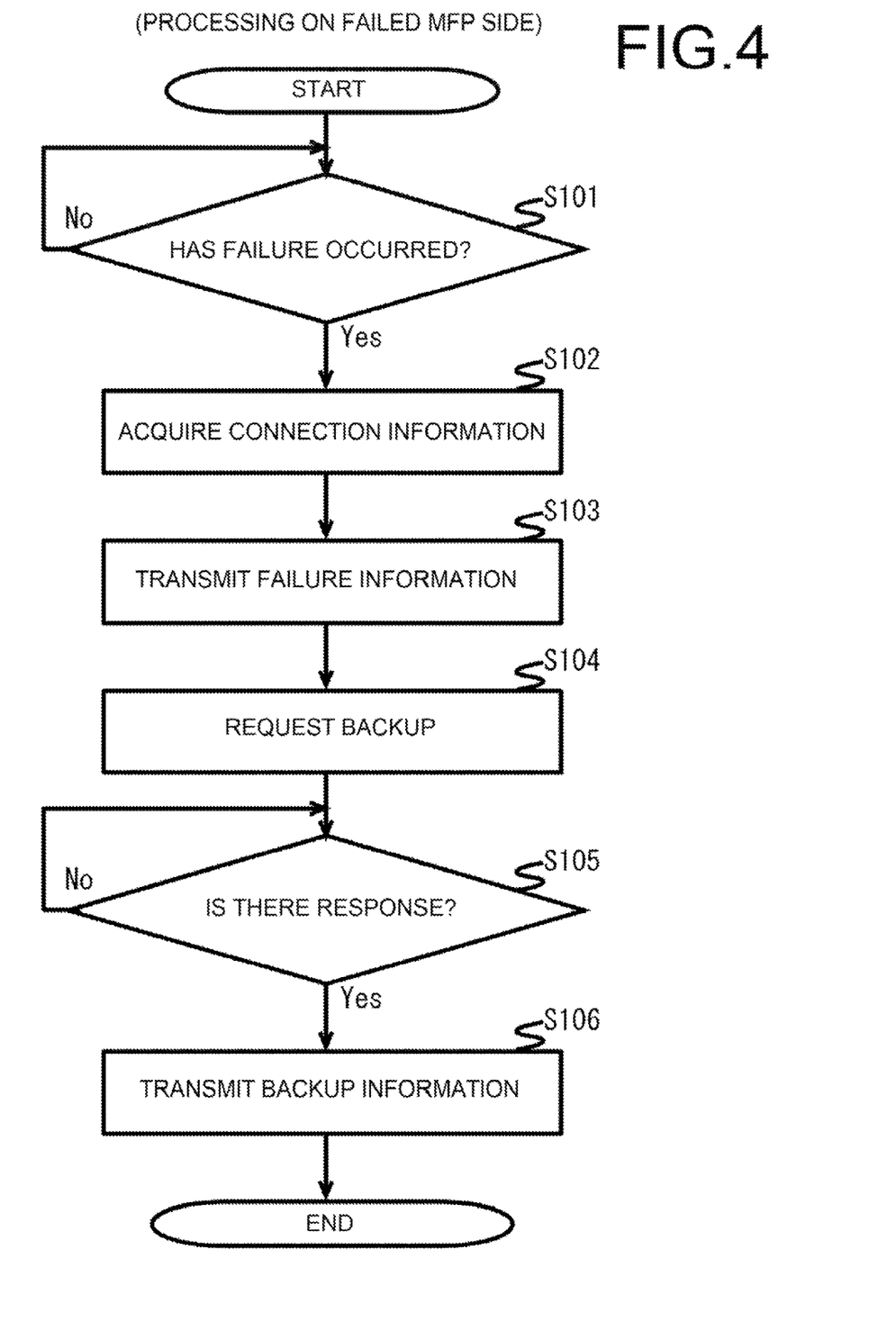
FIG. 4 is a flowchart for describing processing on the MFP side where a failure has occurred in FIG. 1.

Next, the processing on the MFP 100A side where a failure has occurred will be described with reference to FIG. 4.

(Step S101)

The system control unit 121 determines whether or not a failure has occurred.

In this case, when there is no notification from the maintenance management unit 118 notifying of a failure, the system control unit 121 determines that a failure has not occurred (step S101: NO).

On the other hand, when there is a notification from the maintenance management unit 118 notifying of a failure, the system control unit 121 determines that a failure has occurred (step S101: YES), and the process moves to step S102.

(Step S102)

The system control unit 121 acquires connection information.

In this case, the system control unit 121 acquires terminal connection information and server connection information that are managed by the maintenance management unit 118.

When the panel operation control unit 119 receives a start instruction via the panel unit 105 for data backup, the system control unit 121 may acquire the terminal connection information and the server connection information that are managed by the maintenance management unit 118.

(Step S103) The system control unit 121 causes failure information to be transmitted.

In this case, the system control unit 316, via the communication control unit 114, transmits failure information to the maintenance management terminal 200 notifying of the failure contents.

Figure 3:
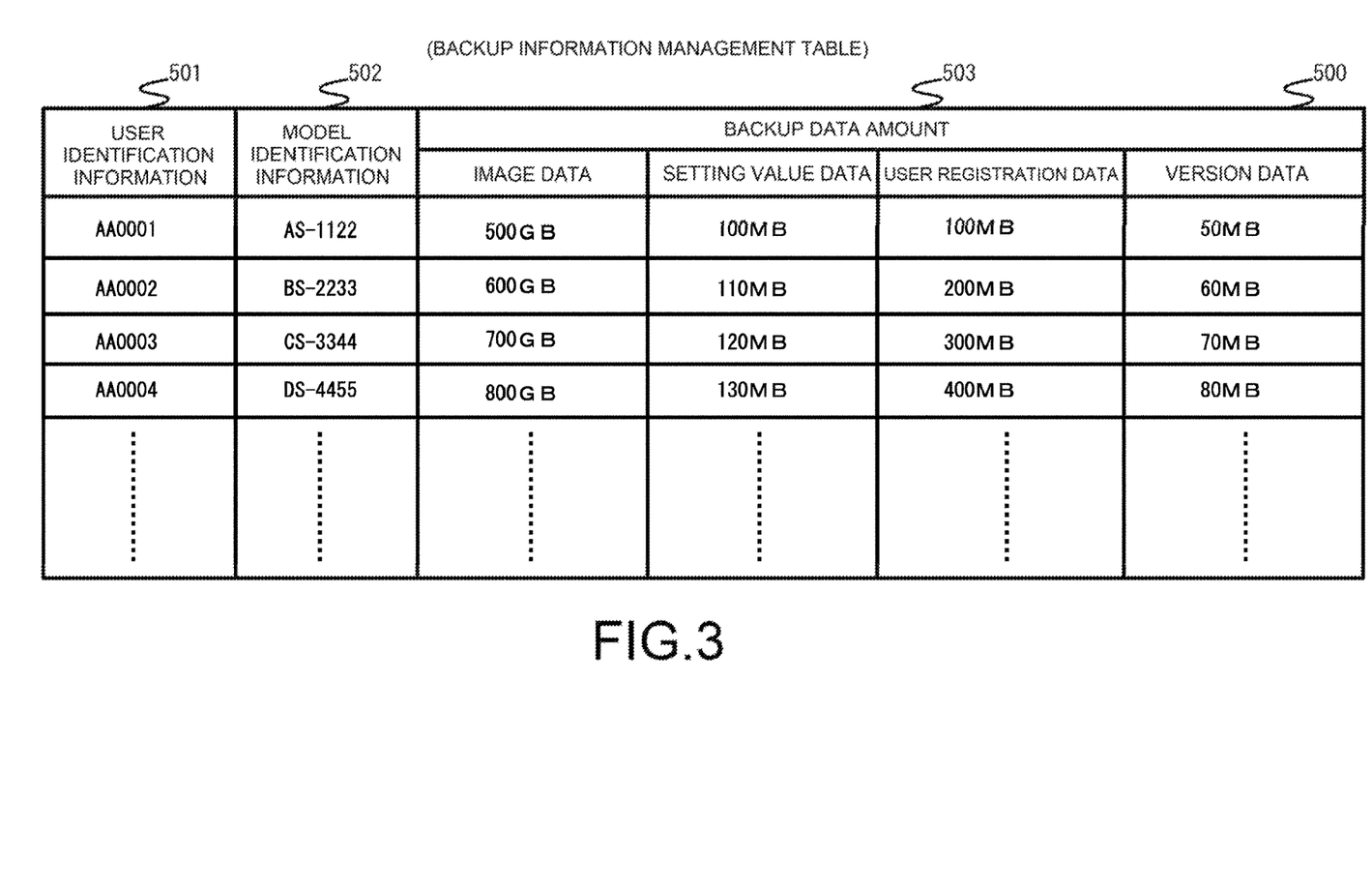
FIG. 3 is a diagram for describing a backup information management unit table that is managed by the backup information management unit in FIG. 2.

Note that the failure information includes the failure contents, the user identification information 501 (corresponds to the user identification information 501 in FIG. 3), and the model identification information 502 (corresponds to the model identification information 502 in FIG. 3). As a result, on the maintenance management terminal 200 side, it is possible to immediately confirm the failure contents, the user and the mode by the failure information, the user identification information 501 and the model identification information 502.

(Step S104)

The system control unit 121 requests a backup.

In this case, the system control unit 121 transmits a backup request to the information management server 300 via the communication control unit 114 based on the server connection information acquired in step S102. In addition, when requesting a backup, the system control unit 121 causes the user identification information 501 (corresponds to the user identification information 501 in FIG. 3) and the model identification information 502 (corresponds to the model identification information in FIG. 3) to be included in the backup request. In addition, the system control unit 121, via the communication control unit 114, transmits MFP connection information that includes address information, a port number and the like of the MFP 100A to the server 300 together with a backup request.

(Step S105)

The system control unit 121 determines whether or not there is a response.

In this case, when there is no notification from the communication control unit 114 indicating that a response has been received from the information management server 300, the system control unit 121 determines that there is no response (step S105: NO).

On the other hand, when there is a notification from the communication control unit 114 indicating that a response has been received from the information management server 300, the system control unit 121 determines that there is a response (step S105: YES), and the process moves to step S106.

(Step S106)

The system control unit 121 transmits backup information.

In this case, the system control unit 121 reads, for example, image data registered by the users, setting value data set by the users, and user registration data of each user that are stored in the HDD 106, and version data of firmware for controlling the operation of each function stored in EEPROM 116, and the like, and transmits the data to the information management server 300 via the communication control unit 114.

Figure 5:
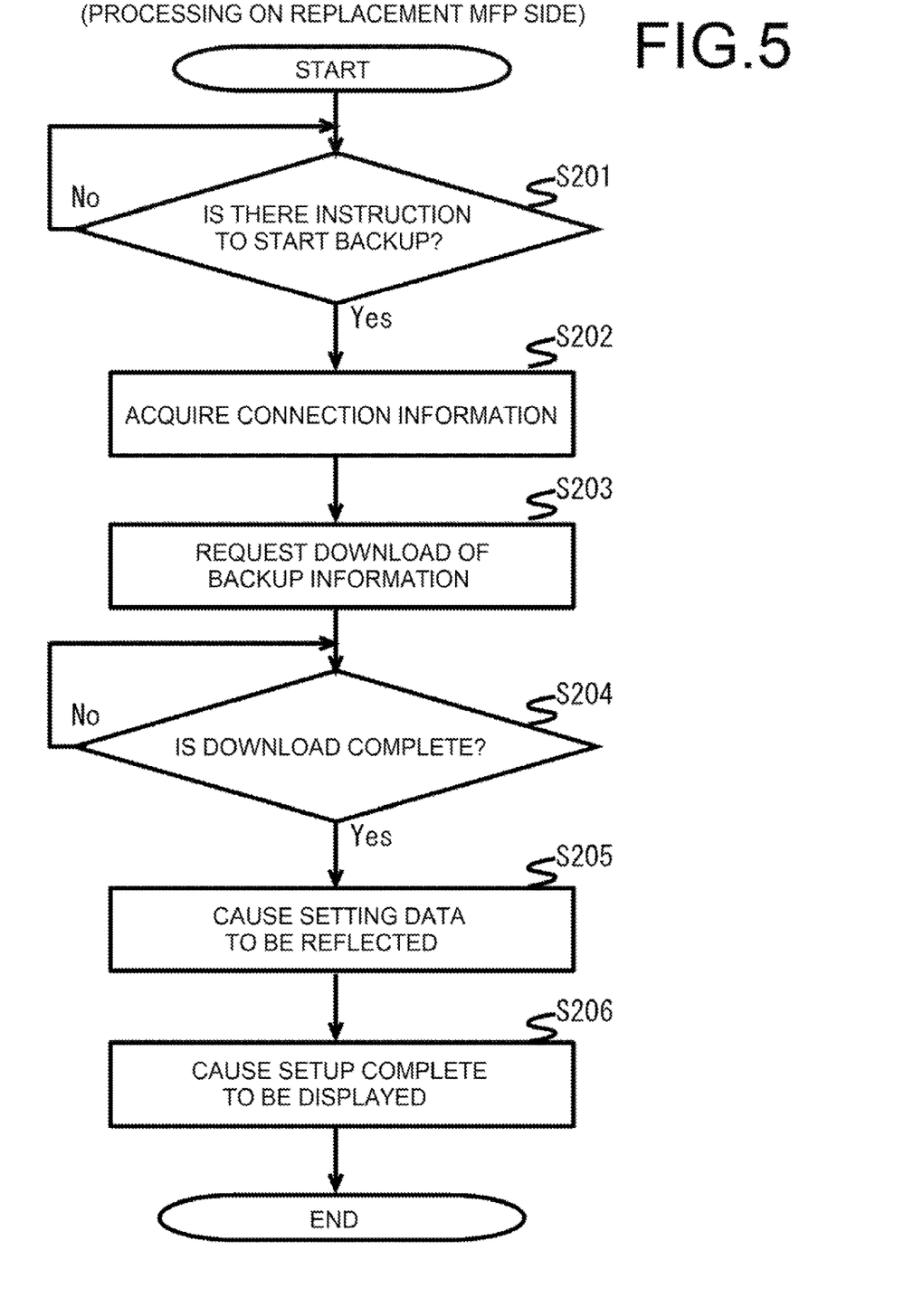
FIG. 5 is a flowchart for describing processing on the replacement MFP side in FIG. 1.

Next, the processing on the replacement MFP 100B side will be described with reference to FIG. 5. Incidentally, in the following, a case will be described in which the MFP 100B is connected to the network 400 in place of the MFP 100A that has failed. In addition, it is presumed that the server connection information, and the user identification information 501 (corresponds to user identification information 501 in FIG. 3) are inputted to the replacement MFP 100B via the panel unit 105, for example, by a maintenance service person or an administrator of the MFP 100B. Moreover, it is presumed that the system control unit 121 of the replacement MFP 100B acquires the storage capacity of storage devices such as the HDD 106, the EEPROM 116 and the like at the time of starting. Furthermore, the backup information that is downloaded from the information management server 300 includes, for example, all of the image data registered by the users, the setting value data set by the users, user registration data of each user, and the version data of firmware that controls the operation of each function.

(Step S201)

The system control unit 121 determines whether or not there is an instruction to start setup.

In this case, when there is no notification indicating that an instruction to start setup is received from the panel operation control unit 119 via the panel unit 105, the system control unit 121 determines that there is no instruction to start setup (step S201: NO).

On the other hand, when there is a notification indicating that an instruction to start setup is received from the panel operation control unit 119 via the panel unit 105, the system control unit 121 determines that there is an instruction to start setup (step S201: YES), and the process moves to step S202.

(Step S202)

The system control unit 121 acquires connection information.

In this case, the system control unit 121 acquires server connection information that is managed by the maintenance management unit 118.

(Step S203)

The system control unit 121 requests a download of backup information.

In this case, the system control unit 121, based on the server connection information managed by the maintenance management unit 118 and via the communication control unit 114, transmits a download request for backup information to the information management server 300.

In addition, the system control unit 121 causes the user identification information 501 (corresponds to the user identification information 501 in FIG. 3), the model identification information 502 (corresponds to the model identification information 502 in FIG. 3), and the storage capacity information indicating the storage capacity of storage devices such as the HDD 106, the EEPROM 116 and the like to be included in the download request. Moreover, the system control unit 121, via the communication control unit 114, transmits MFP connection information that includes address information, a port number and the like of the MFP 100B to the server 300 together with the download request.

(Step S204)

The system control unit 121 determines whether or not the download is complete.

In this case, when there is no notification from the communication control unit 114 indicating that the download of the backup information is complete, the system control unit 121 determines that the download is not complete (step S204: NO).

On the other hand, when there is a notification from the communication control unit 114 indicating that the download of the backup information is complete, the system control unit 121 determines that the download is complete (step S204: YES), and the process moves to step S205.

(Step S205)

The system control unit 121 causes the setting value data to be reflected.

In this case, the system control unit 121 causes the setting value data included in the backup information to be reflected by registering the setting value data in a table (not illustrated) that manages the setting value data, for example. In addition, the system control unit 121 causes, for example, the image data registered by the users and the user registration data of each user that are included in the backup information to be stored in the HDD 106. Moreover, the system control unit 121 causes the version data of firmware that controls the operation of each function that is included in the backup information to be stored in the EEPROM 116.

(Step S206)

The system control unit 121 causes a display indicating that setup is complete to be displayed.

In this case, the system control unit 121, via the panel operation control unit 119, causes the panel unit 105 to display content indicating that setup is complete.

As described above, by the system control unit 121 causing the setting value data to be reflected in step S205, setup of the replacement MFP 100B is complete, so it is possible to immediately use the replacement MFP 100B.

Next, processing on the information management server 300 side will be described with reference to FIG. 6. Note that in the following, a case will be described in which there is a backup request from the MFP 100A in which a failure has occurred, and a download request from the replacement MFP 100B. Moreover, the backup request from the MFP 100A includes user identification information 501 (corresponds to user identification information 501 in FIG. 3) and the model identification information 502 (corresponds to model identification information 502 in FIG. 3) of the MFP 100A in which failure occurred. Furthermore, the download request from the replacement MFP 100B includes the user identification information 501 (corresponds to the user identification information 501 in FIG. 3), the model identification information 502 (corresponds to the model identification information 502 in FIG. 3), and the storage capacity information indicating the storage capacity of storage devices such as the HDD 106, the EEPROM 116 and the like. In addition, in the following, it is presumed that the user identification information 501 included in the download request is, for example, AA0001.

(Step S301)

The system control unit 316 determines whether or not there is a backup request.

In this case, when there is no notification from the communication control unit 313 indicating that a backup request has been received, the system control unit 316 determines that there is no backup request (step S301: NO), and the process moves to step S306.

On the other hand, when there is a notification from the communication control unit 313 indicating that a backup request has been received, the system control unit 316 determines that there is a backup request (step S301: YES), and the process moves to step S302. Incidentally, the system control unit 316, via the communication control unit 313, may acquire MFP connection information of the MFP 100A together with a backup request.

(Step S302)

The system control unit 316 transmits a response based on the MFP connection information of the MFP 100A.

In this case, system control unit 316, via communication control unit 313, transmits a response to the MFP 100A. Note that the response may include information for allowing backup.

(Step S303)

The system control unit 316 determines whether or not reception is complete.

In this case, when there is no notification from the communication control unit 313 indicating that reception of the backup information is complete, the system control unit 316 determines that reception is not complete (step S303: NO).

On the other hand, when there is a notification from the communication control unit 313 indicating that reception of the backup information is complete, the system control unit 316 determines that reception is complete (step S303: YES), and the process moves to step S304.

(Step S304)

The system control unit 316 causes the backup information to be stored.

In this case, the system control unit 316, via the HDD control unit 315, causes the backup information to be stored in the HDD 302. The backup information, as described above, is information stored in the HDD 106 or the EEPROM 116 of the MFP 100A, and includes, for example, image data registered by the users, setting value data set by the users, user registration data of each user, version data of firmware that controls the operation of each function, and the like.

(Step S305)

The system control unit 316 instructs registration in a management table.

In this case, the system control unit 316 instructs the backup information management unit 314 to register in the backup information management table 500. In addition, the system control unit 316 notifies the backup information management unit 314 of the user identification information 501, the model identification information 502, and the backup data amount 503.

At this time, the backup information management unit 314 registers the user identification information 501, the model identification information 502, and the backup data amount 503 in the backup information management table 500 in FIG. 3.

(Step S306)

The system control unit 316 determines whether or not there is a download request.

In this case, when there is no notification from the communication control unit 313 indicating that a download request has been received, the system control unit 316 determines that there is no download request (step S306: NO). Note that when there is no notification from the communication control unit 313 within a set amount of time indicating that a download request has been received, the process may be terminated.

On the other hand, when there is a notification from the communication control unit 313 indicating that a download request has been received, the system control unit 316 determines that there is a download request (step S306: YES), and the process moves to step S307. Incidentally, the system control unit 316, via the communication control unit 313, may acquire the MFP connection information of the MFP 100B together with the download request.

At this time, the system control unit 316 confirms the user identification information 501 (corresponds to the user identification information 501 in FIG. 3), the model identification information 502 (corresponds to the model identification information 502 in FIG. 3), and the storage capacity information indicating the storage capacity of storage devices such as the HDD 106, the EEPROM 116 and the like that are included in the download request.

(Step S307)

The system control unit 316 determines whether or not the user identification information 501 is registered.

In this case, the system control unit 316 references the backup information management table 500 managed by the backup information management unit 314, and when the user identification information 501 included in the download request is not registered in the backup information management table 500, the system control unit 316 determines that the user identification information 501 is not registered (step S307: NO), and the process moves to step S312.

On the other hand, the system control unit 316 references the backup information management table 500 managed by the backup information management unit 314, and when the user identification information 501 included in the download request is registered in the backup information management table 500, the system control unit 316 determines that the user identification information 501 is registered (step S307: YES), and the process moves to step S308.

In other words, in a case where the user identification information 501 included in the download request is, for example, AA0001, by the same user identification information 501 being registered in the backup information management table 500, it is possible to determine that the user identification information 501 is registered.

(Step S308)

The system control unit 316 determines whether or not the MFP 100B that is the backup request source and the MFP 100A registered in the backup information management table 500 are the same model.

In this case, when the model identification information 502 included in the download request is not registered in the backup information management table 500 in FIG. 3, and for example is EE-1234, the first two characters are different from the first two characters of AS-1122 of the model identification information 502, so the system control unit 316 determines that the models are not the same (step S308: NO), and the process moves to step S310.

On the other hand, when the model identification information 502 included in the download request is registered in the backup information management table 500 in FIG. 3, and for example is AS-1234, the first two characters are the same as the first two characters of AS-1122 of the model identification information 502, so the system control unit 316 determines that the models are the same (step S308: YES), and the process moves to step S309.

(Step S309)

The system control unit 316 determines whether or not transmission of all data is possible. More specifically, the system control unit 316 determines whether or not all the data of the backup information fits in the storage device of MFP 100B.

In this case, the system control unit 316 compares the storage capacity of the storage devices such as the HDD 106, the EEPROM 116 or the like of the MFP 100B included in the download request with the backup data amount 503 of the backup information management table 500, and when the storage capacity of the storage devices is less than the backup data amount 503, the system control unit 316 determines that transmission of all data is impossible (step S309: NO), and the process moves to step S311.

On the other hand, the system control unit 316 compares the storage capacity of the storage devices such as the HDD 106, the EEPROM 116 or the like of the MFP 100B included in the download request with the backup data amount 503 of the backup information management table 500, and when the storage capacity of the storage devices is greater than the backup data amount 503, the system control unit 316 determines that transmission of all data is possible (step S309: YES), and the process moves to step S310.

In other words, as illustrated in the backup information management table 500, when the user identification information 501 is AA0001 and the model identification information 502 is AS-1122, the total of the backup data amount 503 is 500.15 GB. Here, when the storage capacity of the storage devices of the MFP 100B is 500 GB or less, the system control unit 316 determines that transmission of all data is impossible. However, when the storage capacity of the storage devices of the MFP 100B is greater than 500.15 GB of the backup data amount 503, the system control unit 316 determines that transmission of all data is possible.
(Step S310)

The system control unit 316, based on the MFP connection information of the MFP 100B, transmits all the data.

In this case, the system control unit 316, via the communication control unit 313, reads the backup information, for example, image data registered by the users, setting value data set by the users, user registration data of each user, version data of firmware that controls the operation of each function, and the like stored in the HDD 302, and transmits the data to the MFP 100B.

In other words, when the system control unit 316 determines that the models are the same in step S308, the system control unit 316 determines that the capacity of the storage devices of the MFP 100B that requested the download is the same as the capacity of the storage devices of the MFP 100A that transmitted the backup information, and causes all data to be transmitted.

In addition, in a case where the storage capacity of the storage devices of the MFP 100B exceeds the data to be transmitted in step S309, the system control unit 316 determines that there will be no problem even in when transmitting all of the data, so causes all of the data to be transmitted.
(Step S311)

The system control unit 316, based on the MFP connection information of the MFP 100B, transmits part of the data.

In this case, of the data, for example, the image data registered by the users, the setting value data set by the users, the user registration data of each user, the version data of firmware that controls the operation of each function, and the like that is the backup information stored in the HDD 302, the system control unit 316 preferentially transmits the setting value data that is set by the users and that is necessary for setup. Note that in addition to the setting value data, the system control unit 316 may transmit user registration data and version data of firmware that are estimated to be smaller than the image data of the backup data amount 503 as part of the data necessary for setup. At this time, the system control unit 316 may notify the MFP 100B that there is data that has not been transmitted.
(Step S312)

The system control unit 316 notifies that there is no information that can be downloaded.

In this case, when the user identification information 501 included in the download request is not registered in the backup information management table 500 in step S307, the system control unit 316 determines that there is no backup information, and via the communication control unit 313, notifies the MFP 100B that there is no information that can be downloaded.

As described above, in this embodiment, when the system control unit 121 (first system control unit) of the MFP 100A (first image forming apparatus) is instructed to start backup of data stored in the HDD 106 and the EEPROM 116 (first storage device), the system control unit 121 transmits data to the information management server 300, and when the system control unit 121 (second system control unit) of the MFP 100B (second image forming apparatus) is instructed to start setting, the system control unit 121 transmits a download request including the storage capacity of HDD 106 and EEPROM 116 (second storage device) to the information management server 300, then the system control unit 316 (third system control unit) of the information management server 300 stores data from the MFP 100A (first image forming apparatus) in the HDD 302 (third storage device), reads the data corresponding to the storage capacity of the HDD 106 and the EEPROM 116 (second storage device) from the HDD 302 (third storage device) and transmits that data to the MFP 100B (second image forming apparatus).

As a result, MFP 100B (second image forming apparatus) downloads data corresponding to the storage capacity of HDD 106 and EEPROM 116 (second storage device) from information management server 300, whereby information from the MFP 100A (first image forming apparatus) may easily be transferred over, and use of the replacement image forming apparatus can be performed immediately.

Figure 6:
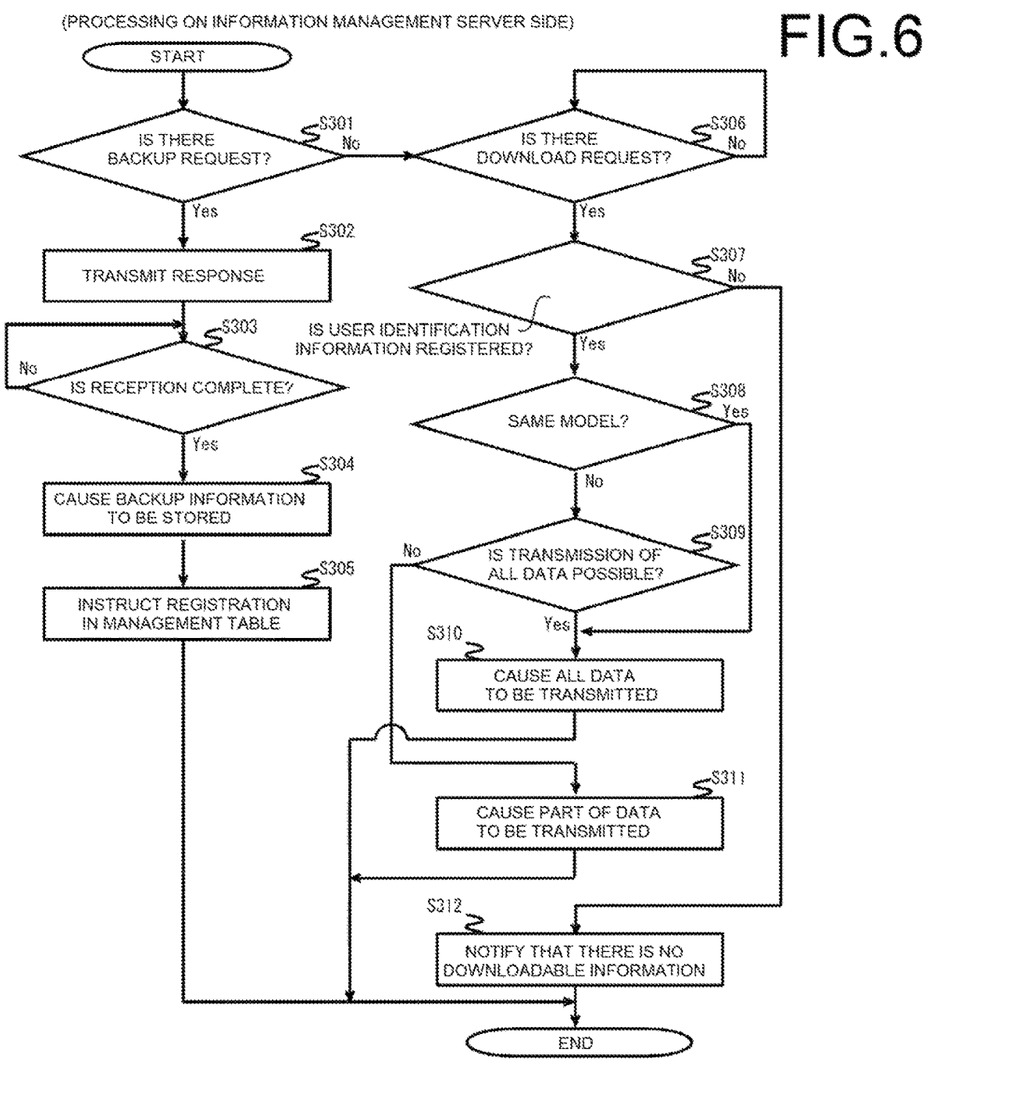
FIG. 6 is a flowchart for describing processing on the information distribution server side in FIG. 1.

In addition, in the description above, in a case where the result of step S301 illustrated in FIG. 6 is YES, the system control unit 316 may transmit a request for MFP connection information to the MFP 100A via the communication control unit 313 before step S302. In this case, the system control unit 121 of the MFP 100A, based on a request from the server 300, transmits the MFP connection information via the communication control unit 114.

Moreover, in description above, in a case where the result in step S306 illustrated in FIG. 6 is YES, the system control unit 316 may transmit a request for MFP connection information to the MFP 100B via the communication control unit 313 before step S310 or step S311. In this case, the system control unit 121 of the MFP 100B, based on the request from the server 300, transmits the MFP connection information via the communication control unit 114.

In addition, the system control unit 316 of the server 300 may monitor the connection state of the MFP 100A to the network 400. More specifically, after step S303 illustrated in FIG. 6 is complete (or this may be after step S304 or step S305 is complete), the system control unit 316, based on the acquired MFP connection information of the MFP 100A, and via the communication control unit 313, transmits a response request (for example, a ping command) to the MFP 100A at set times, and when there is no response, determines that the MFP 100A is disconnected from the network 400. After that, when it is determined in step S306 illustrated in FIG. 6 that there is a download request from the replacement MFP 100B, the system control unit 316 executes the processing from step S307 on. In a case where the system control unit 316 receives a download request from the replacement MFP 100B via the communication control unit 313 while it is not determined that the MFP 100A is disconnected from network 400, the process shown in FIG. 6 may be terminated. Alternatively, in a case where the system control unit 316 determines in step S306 illustrated in FIG. 6 that there is a download request from the replacement MFP 100B while it is not determined that the MFP 100A is disconnected from network 400, the system control unit 316 may suspend the processing from step S307 on until the MFP 100A becomes disconnected from the network 400.

As a result, in a case where the MFP 100B is not a replacement but an added MFP, it is possible to prevent the download of data.

In addition, in a case where the system control unit 316 of the server 300 described above monitors the connection state of the MFP 100A to the network 400 and determines in step S306 illustrated in FIG. 6 that there is a download request from the replacement MFP 100B, the system control unit 316 compares the address information included in the MFP connection information of the MFP 100A and the address information included in the MFP connection information of the MFP 100B, and when there is a match, executes the processing after that. Here, the comparison of the address information may be performed at a specific timing between step S306 and step S310 illustrated in FIG. 6. However, when the MFP 100A is not disconnected from network 400, the system control unit 316 ends the process illustrated in FIG. 6 without comparing the address information. Alternatively, when the MFP 100A is not disconnected from network 400, the system control unit 316 ends the process illustrated in FIG. 6 without performing the processing after that, even when the comparison result is a match.

As a result, in addition to the case where the MFP 100B is not a replacement but is an added MFP, the download of data may be prevented when the MFP 100A is connected as is to the network (in other words, the MFP 100A is not replaced by another MFP).

Moreover, when the system control unit 316 of the server 300 described above monitors the connection state of the MFP 100A to the network 400, the connection state of the MFP 100B to the network 400 may also be monitored. More specifically, after determining that the MFP 100A is disconnected from the network 400, the system control unit 316, via the communication control unit 313, transmits a request for MFP connection information by a broadcast. The system control unit 121 of the MFP 100B transmits the MFP connection information of the own apparatus to the server 300 in response to the request for the MFP connection information. Of the address information included in the MFP connection information received via the communication control unit 313, the system control unit 316 determines whether or not there is address information that matches the address information included in the MFP connection information of MFP 100A. The presence of matching address information means that the MFP 100B having the same address information as the MFP 100A is connected to the network 400. When there is matching address information, the system control unit 316 executes the processing from step S306 on illustrated in FIG. 6.

As a result, after it is confirmed that the MFP 100A has been replaced by the MFP 100B, data can be downloaded.

Moreover, in a case where the system control unit 316 of the server 300 described above monitors the connection state of the MFP 100A to the network 400, the connection state of the MFP 100B to the network 400 may also be monitored by another method. More specifically, after determining that MFP 100A has been disconnected from network 400, the system control unit 316, via the communication control unit 313 and based on the address information included in the MFP connection information of MFP 100A, transmits a response request (for example, a ping command) at set times. Here, presuming that the same address information as that of the MFP 100A is set for the MFP 100B, the system control unit 121 of the MFP 100B, via the communication control unit 114, receives the response request. The system control unit 121, via the communication control unit 114, responds to the server 300 in response to the response request. After receiving the response from MFP 100B via communication control unit 313, the system control unit 316 executes the processing from step S306 on illustrated in FIG. 6.

Moreover, in the present embodiment, the apparatuses for backing up data to the information management server 300 have been described as MFPs 100A and 100B, however the present invention is not limited to this example, and may be applied to other apparatuses such as a PC (personal computer), portable terminal, tablet terminal and the like.

The invention claimed is:

1. An information management system comprising:
a first image forming apparatus that transmits data stored in a first storage device;
a second image forming apparatus that downloads the data and stores the data in a second storage device; and
an information management server that stores the data from the first image forming apparatus in a third storage device, and transmits the data stored in the third storage device according to a download request from the second image forming apparatus; wherein
the first image forming apparatus has a first system control unit that, when there is an instruction to start backup of the data, transmits the data to the information management server;
the second image forming apparatus has a second system control unit that, when there is an instruction to start setting, issues the request including a storage capacity of the second storage device to the information management server; and
the information management server has a third system control unit that reads the data according to the storage capacity of the second storage device from the third storage device and transmits the data to the second image forming apparatus;
wherein
the information management server has a backup information management unit;
the first system control unit transmits first model identification information that includes information indicating a first model;
the second system control unit transmits second model identification information that includes information indicating a second model;
the backup information management unit manages the data from the first image forming apparatus in association with the first model identification information;
the third system control unit, in a case where the second model included in the second model identification information matches the first model included in the first model identification information, transmits all of the data stored in the third storage device, and in a case where the second model included in the second model identification information does not match the first model included in the first model identification information, determines whether or not the data fits in a storage capacity of the second storage device, and reads the data that fits in the storage capacity of the second storage device from the third storage device and transmits the data.

2. The information management system according to claim 1, wherein
in a case where the second model included in the second model identification information does not match the first model included in the first model identification information, the third system control unit transmits all of the data stored in the third storage device when the storage capacity of the second storage device is larger than a size of the data stored in the third storage device; and transmits the data that fits in the storage capacity of the second storage device when the storage capacity of the second storage device is smaller than a size of the data stored in the third storage device.

3. The information management system according to claim 2, wherein
the data transmitted by the first image forming apparatus includes data necessary for setup and data that is a target of processing; and
when the storage capacity of the second storage device is smaller than the size of the data stored in the third storage device, the third system control unit transmits the data necessary for setup.

4. The information management system according to claim 1, wherein
the first system control unit transmits the first user identification information;
the second system control unit transmits the second user identification information; and
in a case where the second user identification information matches the first user identification information, the third system control unit enables transmission of the data stored in the third storage device to the second image forming apparatus.

5. The information management system according to claim 1, wherein
the third system control unit monitors a connection state of the first image forming apparatus to a network, and in a case where after the first image forming apparatus that transmitted the data is disconnected from the network, the request is acquired from the second image forming apparatus, the third system control unit enables transmission of the data stored in the third storage device to the second image forming apparatus.

6. The information management system according to claim 1, wherein
the first system control unit transmits first address information of the first image forming apparatus;
the second system control unit transmits second address information of the second image forming apparatus; and
in a case where the second address information matches the first address information, the third system control unit enables transmission of the data stored in the third storage device to the second image forming apparatus.

7. The information management system according to claim 6, wherein
the third system control unit monitors a connection state of the first image forming apparatus to a network, and in a case where after the first image forming apparatus that transmitted the data is disconnected from the network, the request is acquired from the second image forming apparatus having the second address information that matches the first address information, and the third system control unit enables transmission of the data stored in the third storage device to the second image forming apparatus.

8. The information management system according to claim 6, wherein
the third system control unit monitors a connection state of the first image forming apparatus and the second image forming apparatus to a network, and in a case where after the first image forming apparatus that transmitted the data is disconnected from the network, the second image forming apparatus having the second address information that matches the first address information is connected to the network, the third system control unit enables transmission of the data stored in the third storage device to the second image forming apparatus.

9. The information management system according to claim 1, wherein
the first system control unit transmits first address information of the first image forming apparatus;
the third system control unit monitors the connection state of the first image forming apparatus to a network; and
in a case where after the first image forming apparatus that transmitted the data is disconnected from the network, the third system control unit transmits a response request based on the first address information, and a response to the response request is acquired, enables transmission of the data stored in the third storage device to the second image forming apparatus.

10. An information management server, comprising:
a third storage device that stores data transmitted from a first image forming apparatus and stored by a first storage device;
a third system control unit that, according to a download request from a second image forming apparatus having a second storage device, reads the data according to a storage capacity of the second storage device from the third storage device, and transmits the data to the second image forming apparatus; and
a backup information management unit; wherein
the backup information management unit manages the data in association with first model identification information that is transmitted from the first image forming apparatus;
the third system control unit, in a case where a model included in the second model identification information transmitted from the second image forming apparatus matches a model included in the first model identification information, transmits all of the data stored in the third storage device, and in a case where a model included in the second model identification information does not match a model included in the first model identification information, reads the data that fits in a storage capacity of the second storage device from the third storage device.

* * * * *